United States Patent [19]

Justus

[11] Patent Number: 4,817,841

[45] Date of Patent: Apr. 4, 1989

[54] THREADING BAR FOR USE WITH A WIRE COATING APPARATUS HAVING PARALLEL TRANSPORT CABLES

[75] Inventor: Paul E. Justus, Fort Wayne, Ind.

[73] Assignee: Essex Group, Inc., Fort Wayne, Ind.

[21] Appl. No.: 128,374

[22] Filed: Dec. 3, 1987

[51] Int. Cl.4 .................................... G03B 1/56

[52] U.S. Cl. .................................... 226/92

[58] Field of Search .................... 226/91, 92, 133; 24/134 L

[56] References Cited

U.S. PATENT DOCUMENTS

| | | | |
|---|---|---|---|
| 1,069,250 | 8/1913 | Harrison | 24/134 L |
| 2,277,319 | 3/1942 | Greenberger | 226/92 |
| 2,780,346 | 2/1957 | Roughsedge et al. | 226/92 |
| 3,606,116 | 9/1971 | Kallenborn et al. | 226/92 X |
| 4,169,551 | 10/1979 | Jensen | 226/92 |
| 4,188,108 | 1/1980 | Falomo | 226/92 X |
| 4,540,324 | 10/1985 | Kogane et al. | 226/92 X |

*Primary Examiner*—Joseph J. Hail, III

[57] ABSTRACT

A threading bar and a process for using the threading bar with a wire coating apparatus having parallel transport cables is disclosed. The threading bar comprises a body portion suitable for attaching wires thereto, and a gripping mechanism which is used to selectively engage a portion of a transport cable so as to secure the body portion to the transport cable. Process steps include the use of such a threading bar to draw wire through a wire coating apparatus.

4 Claims, 2 Drawing Sheets

THREADING BAR FOR USE WITH A WIRE COATING APPARATUS HAVING PARALLEL TRANSPORT CABLES

DESCRIPTION

1. Technical Field

The present invention relates to apparatus used for coating wires. Particularly the present invention relates to an apparatus to be used in conjunction with a wire coating apparatus provided with a wire transport system utilizing parallel transport cables.

2. Background Art

Insulated wire comprised of a metal wire coated along its exterior radius or surface with a layer or a plurality of layers of an insulating material is most commonly produced by use of a wire coating apparatus.

Commonly, a typical wire coating apparatus includes a die station and a drying and curing oven. The die station includes a trough, channel, reservoir, or other means for containing the insulating material, and further includes at least one die provided with an internal passage. Typically, the insulating material is a solution or mixture of polymers and prepolymers in an organic solvent and is referred to in the art as "insulating enamel". The drying and curing oven is commonly a tall vertical oven which provides adequate thermal output to evaporate any organic solvent in the insulating enamel and cure and dry the prepolymers within the insulating enamel.

In operation, the wire to be coated is first transferred to the die station where it passes through the reservoir used for containing the insulating enamel where a layer of the insulating enamel adheres to the surface of the wire. Next, the wire passes through the internal passage provided within the die, which has a dimension of a suitable size so to permit the passage of the wire and a specified thickness of the enamel clinging to the surface of the wire. Subsequently, the wire passing out of the die passes into the drying and curing oven where the layer of insulating enamel undergoes evaporation, or "burning off" of any organic solvent and hardening of the remaining polymers and prepolymers. Afterwards, the wire exits the drying and curing oven.

Frequently, this operation is repeated and the coated wire is again drawn through the reservoir containing the insulating material, then through a next die having an inner diameter slightly greater than that of the prior die, and then through the oven. This operation is repeated until the desired number of layers of insulating material have been laid upon the surface of the wire.

To effect economic production of wire, a plurality of separate wires may be simultaneously produced by simultaneously drawing these separate wires through the wire coating apparatus in order to produce the desired insulated wire. Such operations are commonly known as a "multi-wire, multi-pass", process. As is well known to the art at the present time, multi-wire, multi-pass processes are the most commonly used methods for producing magnet wire as the metal wire may be coated with a plurality of layers of insulating material in a very cost effective manner.

The production of wire, especially magnet wire, may be cost effectively produced in a wire coating apparatus designed or adapted to multi-wire, multi-pass processes, but such wire coating apparatus remain plagued with difficulties in startup and operation of the process, including wire breakage during the initialization of the process, where the plurality of separate wires are situated along the process path, i.e. the course or path which these separate wires will take during the multi-wire, multi-pass process. Various apparatus have been produced in order to minimize such breakage and other difficulties. Examples include, U.S. patent application Ser. Nos. 078,725 entitled "Wire Transport System and Process for Threading a Wire Coating Apparatus", filed on July 27, 1987 now abandoned and 941,903 entitled "Die Bar with Integral Locking Means", filed on Dec. 12, 1986 now U.S. Pat. No. 4,759,960. However useful these devices may be, there remains a continuing need in the art for improved devices and further improved processes.

DISCLOSURE OF INVENTION

One object of the present invention is to provide an apparatus for use in conjunction with a wire coating apparatus utilizing parallel transport cables for selectively engaging said parallel transport cables and positioning a wire within the wire coating apparatus. A further object of the present invention is to provide a method for positioning and drawing a wire through wire coating apparatus.

According to the invention these objects are realized by an apparatus having body portion and at least one gripping means suitable for selectively securing a portion of a transport cable within a wire coating apparatus.

A further aspect of the present invention includes a method of transporting a wire within a wire coating apparatus having parallel transport cables which include the steps of positioning the threading bar of the present invention between and engaging said parallel transport cables, attaching at least one wire to the threading bar, and activating the parallel transport cables to transport the threading bar within the wire coating apparatus.

The foregoing and other features and advantages of the present invention will become more apparent from the following description and accompanying drawing.

BEST MODE FOR CARRYING OUT THE INVENTION

Figure 1:
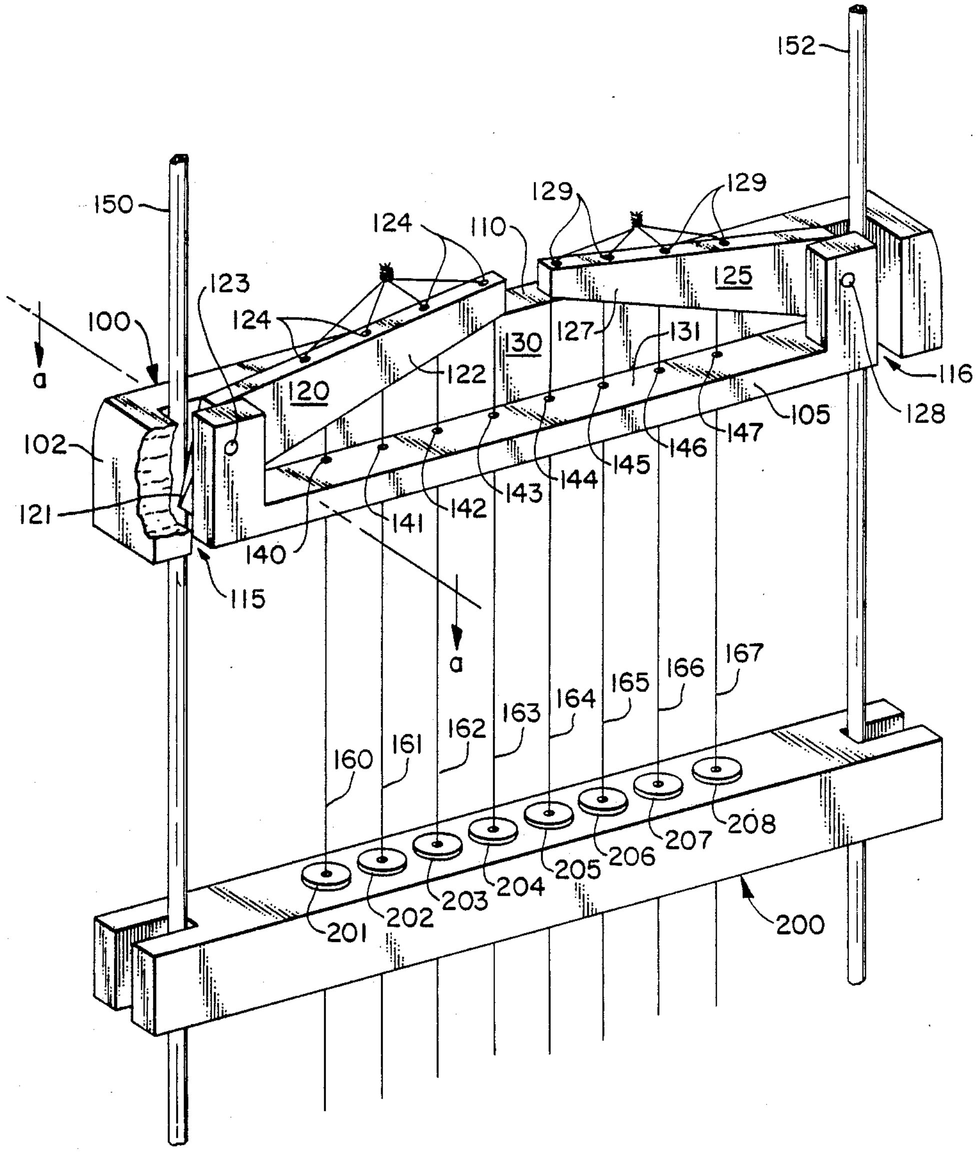
FIG. 1 illustrates a perspective view of the preferred embodiment of the threading bar and further illustrates a die bar.

Turning now to the drawings, FIG. 1 illustrates a perspective view of the preferred embodiments of the threading bar and illustrates a die bar. As shown, the threading bar has a body portion 100 generally rectangular in form which has a left end face 102, a right end face (not shown), a front face 105, a back face (not shown), a top face 110 and a bottom face (not shown).

As may be seen a left channel 115 and a right channel 116 pass through the front face 105, top face 110 and bottom face of the body portion 110 in a direction parallel to the left end face 102 and parallel to the right end face, respectively. Both the left channel 115 and a right channel 116 are dimensioned to allow a portion of the left transport cable 150 and right transport cable 152 to be admitted into the left channel 115 and right channel 116, respectively.

Further reference to FIG. 1 shows two lever arms, a left lever arm 120 with a gripping end 121 and a lever portion 122, which is defined as that portion of the left lever arm 120 opposite the gripping end 121 with reference to the pivot mount 123. The use of the pivot mount 123 allows for movement of the left lever arm 120 so that as the left lever arm 120 is moved about the pivot mount 123 a portion of the left lever arm 120, namely the gripping end 121, extends into the left channel 115 and contacts the portion of the left transport cable 150 which is disposed within the left channel 115, and acts to compress the portion of the left transport cable 150 within the confines of the left channel 115. This acts to selectively secure the threading bar to a portion of the left transport cable 150. This left lever arm 120 and the body portion 100 is the left gripping means.

A right lever arm 125 has a gripping end, which is eccentric giving a mechanical advantage (not shown) a lever end 127, and a pivot mount 128 is also shown, and each portion of the right lever arm 125 acts in an analogous fashion to its counterpart, namely the left lever arm 120. The right lever arm 125 and body portion 100 is the right gripping means.

The body portion 100 as illustrated in FIG. 1 which includes an inner back face 130 parallel to the back face of the body portion 100, and an inner bottom face 131 parallel to the bottom face of the body portion 100. Additionally, a series of passages 140–147 pass through the body portion from the inner bottom face 131 to the bottom face, with a spacing in between one another equal to or approximately equal to that of the distance between the centers of each of the dies 201–208 contained within the die bar 200. Further each passage 140–147 is of sufficient cross section or dimension to admit the passage of one of the wires 160–167 through the passage so that a portion of one of the wires 160–167 may be removably fastened to either the left lever arm 120 or right lever arm 125. In the preferred embodiment of the invention (as shown in FIG. 1), this is accomplished by providing passages 124 in the left lever arm 120 and passages 129 in the right arm 125 suitably dimensioned so that the individual wires 160–167 may be extended therethrough and bundled together, as shown. This simple method provides an effective fashion for securely attaching the wire 160–167 to the threading bar and simultaneously function to engage the left and right gripping means outlined. This is accomplished by the weight of the wires and drag forces acting on them as they are drawn through the wire coating apparatus causes movement of the left lever arm 120 and right lever arm 125 around their respective pivot mounts so that the left gripping end 121 and right gripping end engage the left transport cable 150 and right transport 152 securely. This ensures that the threading bar will remain fastened to the transport cables in a particular location upon the transport cable while the threading bar is emplaced and at least one gripping means engaged.

It should be noted that for the best enjoyment of the benefits of the present invention the location of the passages 140–147 relative to either or both the left transport cable 150 and right transport cable 152 should correspond to the position of the center of each of the dies 201–208 relative to either or both the left transport cable 150 and right transport cable 152. This will assure that the wire 160 remain parallel through the wire coating apparatus within which the invention is to be used.

Alternatively, the position of the passages 140–147 may be equal to that of the space between the feed sheaves and/or the return sheaves in a wire coating apparatus so that by use of the present invention in conjunction with a wire coating apparatus provided with parallel with parallel transport cables, the wires 160–167 will be properly threaded with their desired spacing onto the return sheaves and/or supply sheaves.

Figure 2:
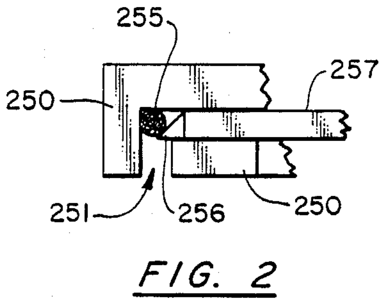
FIG. 2 illustrates a top view of a portion of a threading bar according to the preferred embodiment of FIG. 1 illustrating the preferred embodiment of the gripping means.

Turning now to FIG. 2, illustrated is the top view of a portion of the preferred embodiment of the present invention along the line a—a of FIG. 1. As illustrated, the body portion 250 has a left channel 251 suitably dimensioned to admit a portion of the left transport cable 255 passing therethrough and contained therein. As shown the grip end 256 of the left lever arm 257 is cut on a "diagonal", or shaped so that when the grip end 256 engages the portion of the left transport cable 255, the left transport cable 255 is compressed within the left channel 251 and this acts to selectively secure the body portion 250 to the portion of the left transport cable 255. This more clearly illustrates the preferred form of the gripping means which may be employed, but any device which acts to selectively or removably secure the body portion of the transport bar relative to a portion of at least one transport cable may be used.

Figure 3:
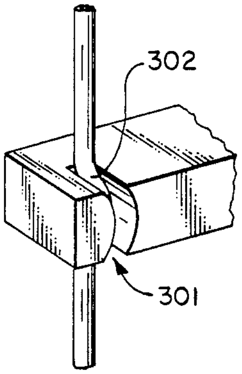
FIG. 3 illustrates an alternative embodiment of a gripping means.
Figure 4:
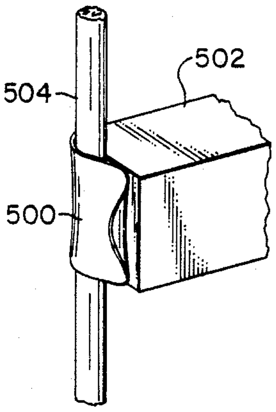
FIG. 4 illustrates a still further alternative embodiment of the gripping means of the present invention.

Forms of gripping means different from the body portion 250 and left gripping end 256 with a configuration as shown on FIG. 2 may be readily employed. FIG. 3 illustrates the use of a left channel 301 having an arcuate shape wherein the insertion of the left transport cable 302 within the arcuate shaped left channel 301 causes the left transport cable 302 to deflect or "bend" and thus provides a "friction fit" which is a wholly acceptable alternative embodiment of a gripping means which may be used. Likewise, FIG. 4 shows a still further alternative embodiment of a gripping means namely a clip-type device 500 affixed to a body portion 502 which is used to retain the position of the body portion 502 relative to the transport cable portion 504.

Figure 5:
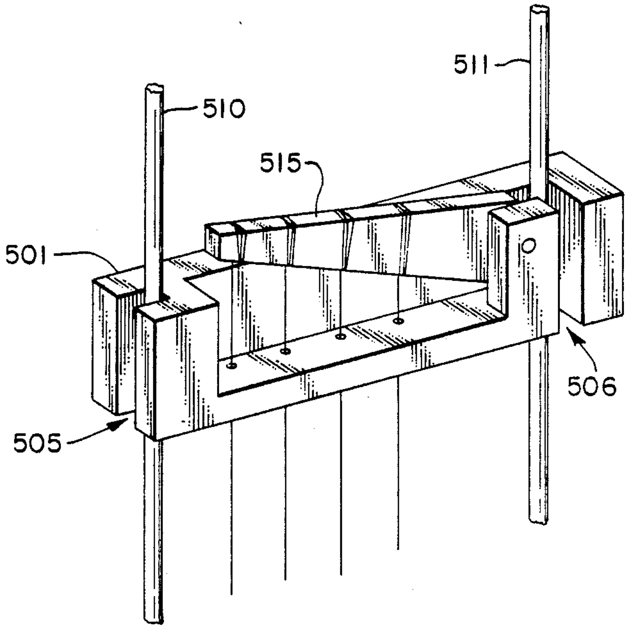
FIG. 5 shows a perspective view of an alternative embodiment of the invention wherein only one gripping means is employed.

Turning now to FIG. 5, a perspective view of an alternative embodiment of the present invention is illustrated. As shown the body portion 501 includes a left channel 505 and a right channel 506 suitable for admitting a portion of the left transport cable 520 and right transport cable 511 respectively. As illustrated, a lever arm 515 having a grip end (not shown) acts with the body portion 501 as a gripping means to selectively secure a portion of the right transport cable 511. Although the use of two gripping means is generally preferred, the use of one gripping means is also acceptable as in the instance where only one transport cable of a wire coating apparatus is engaged and moved through the wire coating apparatus while the other transport cable remains at rest. As an example of the utility of the invention in such an event, the embodiment of FIG. 5 is wholly satisfactory as the left channel 505 cooperates with the left transport cable 510 (which is considered to remain, static or at rest) to guide the body portion 501 through the wire coating apparatus, and the gripping means secures a portion of the right transport cable 511 (which is considered to be dynamic, or in motion) and is drawn through the wire coating apparatus.

The apparatus according to the present invention may be fabricated from any material which is of sufficient mechanical strength and exhibits acceptable thermal qualities in the environment which is normally encountered in a wire coating apparatus. Tool or stainless steel are easily obtainable and are readily formed to the desired shape, and have been found to be totally satisfactory.

The transportation of at least one wire through a wire coating apparatus having parallel transport cables may be easily achieved by attaching the threading bar of the present invention to one or both of the transport cable in a manner suitable to the particular embodiment of the gripping means of the invention employed by engaging the at least one, (preferably both) of the transport cables by the gripping means. Next, wires to be coated are drawn from their supply sources (which may be a spool or reel and in-line drawing machine), and each of these wires may be attached in any acceptable manner to the threading bar including the manners illustrated in FIG. 1 and FIG. 5, or in a manner which includes but is not limited to twisting, tying, wrapping, clamping, or bending. Next, the parallel transport cable is then activated, so to initiate the motion of the transport cable through the wire coating apparatus and thereby draw the threading bar throughout the wire coating apparatus along the process path to be taken by the wire. If the preferred embodiment is constructed and used, wherein the spacing of the passages equals the spacing of the dies, and/or the feed sheaves and/or the return sheaves in the wire coating apparatus, then each of the wires should be threaded in a parallel fashion and with the desired spacing onto the feed and/or supply sheaves throughout the wire coating apparatus automatically. After the threading bar has exited the apparatus after routing itself through the complete process path, the wires may be then disengaged simply, such as by cutting, from the threading bar and the threading bar then removed. Subsequently, the wires may be then brought to individual takeup spools or reels onto which is wound product wire. At this point the wire coating apparatus may be engaged for its normal coating operation.

It should be understood that the invention is not limited to the particular embodiment described herein, but that various changes and modifications may be made with departing from the scope and spirit of this inventive concept as defined by the following claims.

I claim:

1. A threading bar for use in a multistrand wire coating apparatus having parallel transport cables, comprising:

a body portion:

a first gripping means comprising a channel suitably sized to admit a portion of a transport cable therein;

a movable lever arm pivotally mounted to said body portion whereby movement of the lever arm about its pivot mount causes contact between a portion of said lever arm and a portion of the transport cable admitted within the channel:

a second gripping means comprising a second channel suitably sized to admit a portion of a second transport cable therein;

a second movable lever arm pivotally mounted to said body portion whereby movement of the second lever arm about its pivot mount causes contact between a portion of said lever arm and a portion of the second transport admitted within the second channel;

said first and second lever arms each including at least one passage passing therethrough and suitable for admitting a portion of a wire; and a first and second passage passing through the body portion suitably dimensioned for admitting portions of wire wherein the distance between the first passage and the second passage is equal to the spacing between two guide means for the wire within the wire coating apparatus.

2. A threading for use in a multistrand wire coating apparatus having parallel transport cables comprising:

a body portion having two ends, and a plurality of passages therethrough for passing strands of wire;

a first channel suitably sized to admit a portion of a first transport cable of a wire coating apparatus therein near one end;

a second channel, parallel and nonlinear with respect to the first channel suitably sized to admit a portion of a second transport cable of a wire coating apparatus therein near the other end of the body portion;

a first movable lever arm pivotally mounted to said body portion whereby movement of the first lever arm causes contact between a portion of said first lever arm and the portion of the first transport cable within the first channel;

a second movable lever arm pivotally mounted to said body portion whereby movement of the second lever arm causes contact between a portion of said second lever arm and the portion of the second transport cable within said second channel;

each movable lever arm having a plurality of securing points thereon for securing the strands of wire passing through said body to each of said lever arms.

3. A threading bar for use in a multistrand wire coating apparatus having spaced transport cables comprising:

a body portion extending between said transport cables;

a plurality of spaced passages through said body portion, each for admitting and passing a strand of wire;

a first channel suitably sized to admit a portion of a transport cable therein;

a second channel suitably sized to admit a portion of the other transport cable therein;

a movably lever arm having a long portion and a short portion, pivotally mounted to said body portion whereby movement of the long portion of the lever arm causes contact between the short portion of the lever arm and the portion of transport cable within one of said channels; and a plurality of securing points on said long portion of said lever arm for securing the strands of wire passing through the spaced passages in said body to said lever arm.

4. A threading bar as in claim 3 wherein:

said plurality of securing points comprises a plurality of spaced passages through said lever arm.

* * * * *